US012304217B2

(12) United States Patent
Osawa

(10) Patent No.: US 12,304,217 B2
(45) Date of Patent: May 20, 2025

(54) IMAGE FORMING APPARATUS

(71) Applicant: Konica Minolta, Inc., Tokyo (JP)

(72) Inventor: Satoru Osawa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 147 days.

(21) Appl. No.: 18/321,362

(22) Filed: May 22, 2023

(65) Prior Publication Data

US 2023/0391102 A1 Dec. 7, 2023

(30) Foreign Application Priority Data

Jun. 1, 2022 (JP) ................................ 2022-089656

(51) Int. Cl.
*B41J 2/175* (2006.01)

(52) U.S. Cl.
CPC ....... *B41J 2/17596* (2013.01); *B41J 2/17503* (2013.01)

(58) Field of Classification Search
CPC . B41J 2/175; B41J 2/17596; B41J 2/18; B41J 2/17503
See application file for complete search history.

(56) References Cited

U.S. PATENT DOCUMENTS

| | | | | |
|---|---|---|---|---|
| 9,931,860 | B2 * | 4/2018 | Tokimatsu | B41J 2/175 |
| 10,022,978 | B2 * | 7/2018 | Ohtsu | B41J 2/17596 |
| 10,703,111 | B2 * | 7/2020 | Osawa | B01D 63/02 |
| 11,124,007 | B2 * | 9/2021 | Seguchi | C09D 11/322 |
| 2010/0283808 | A1 * | 11/2010 | Terakado | B41J 2/18 347/6 |

FOREIGN PATENT DOCUMENTS

| | | | |
|---|---|---|---|
| JP | 2006103016 | A | 4/2006 |
| JP | 2007229997 | A | 9/2007 |
| JP | 2011126219 | A | 6/2011 |
| JP | 2014188926 | A | 10/2014 |
| JP | 2021070279 | A | 5/2021 |

* cited by examiner

*Primary Examiner* — An H Do
(74) *Attorney, Agent, or Firm* — LUCAS & MERCANTI, LLP

(57) ABSTRACT

An image forming apparatus includes: a main tank that stores ink; a first storage tank that stores the ink supplied from the main tank; an ink head that ejects the ink; a first supply channel for supplying the ink from the main tank to the first storage tank; a second supply channel for supplying the ink from the first storage tank to the ink head; a heating section that is provided in the first supply channel and heats the ink; and a circulation channel for returning the ink in the second supply channel to a part, located between the main tank and the heating section, of the first supply channel.

9 Claims, 8 Drawing Sheets

IMAGE FORMING APPARATUS

The entire disclosure of Japanese Patent Application No. 2022-089656, filed on Jun. 1, 2022, is incorporated herein by reference in its entirety.

BACKGROUND

Technological Field

The present disclosure relates to an image forming apparatus.

Description of the Related Art

Japanese Laid-Open Patent Publication Nos. 2021-70279, 2007-229997, 2006-103016, 2014-188926, and 2011-126219 each disclose an image forming apparatus that forms an image on a recording medium by ejecting ink from an ink head to the recording medium. Generally, in such an image forming apparatus, ejection failure of the ink head occurs. A principal cause of the ejection failure of the ink head is that a component(s) (such as pigment, for example) in ink adheres to and/or remains on a wall surface of an ink channel between the ink head and a main tank which stores ink, resulting in non-uniformity of the ink density and clogging of the ink head with ink.

Japanese Laid-Open Patent Publication No. 2021-70279 discloses a technique for clearing an ink head nozzle clogged with ink, by repeatedly performing a detection process involving an operation of ejecting ink.

Japanese Laid-Open Patent Publication No 2007-229997 discloses a technique for removing pigment adhering to or remaining in an ink channel, by applying a voltage to the ink channel to vibrate the pigment adhering to or remaining in the ink channel.

Japanese Laid-Open Patent Publication No. 2006-103016 discloses a technique for unclogging an ink channel, by stirring pigment-based ink by means of an ink stirring device.

Japanese Laid-Open Patent Publication No. 2014-188926 discloses a technique for eliminating non-uniformity of the ink density, by circulating ink in a circulation channel.

Japanese Laid-Open Patent Publication No. 2011-126219 discloses a technique for unclogging an ink head, by returning ink flowing out of an ink cartridge back to the ink cartridge.

SUMMARY

In such an image forming apparatus that forms an image on a recording medium by ejecting ink, a heating section provided in an ink channel may heat the ink in order to increase the ink viscosity. The inventor of the present invention has noticed a problem that arises in such a case. Specifically, if ink remains for a long time in the channel connecting a main tank and the heating section, ink components become non-uniform due to heat transferred from the heating section.

None of the above-referenced patent publications, however, addresses elimination of the non-uniformity of ink components due to the heating section, because these publications are not directed to such an image forming apparatuses having the heating section in the ink channel.

An object of the present disclosure is to suppress non-uniformity of ink components due to a heating section included in an ink channel of an image forming apparatus.

To achieve at least one of the abovementioned objects, according to an aspect of the present invention, an image forming apparatus reflecting one aspect of the present invention includes: a main tank that stores ink; a first storage tank that stores the ink supplied from the main tank; an ink head that ejects the ink; a first supply channel for supplying the ink from the main tank to the first storage tank; a second supply channel for supplying the ink from the first storage tank to the ink head; a heating section that is provided in the first supply channel and heats the ink; and a circulation channel for returning the ink in the second supply channel to a part, located between the main tank and the heating section, of the first supply channel.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
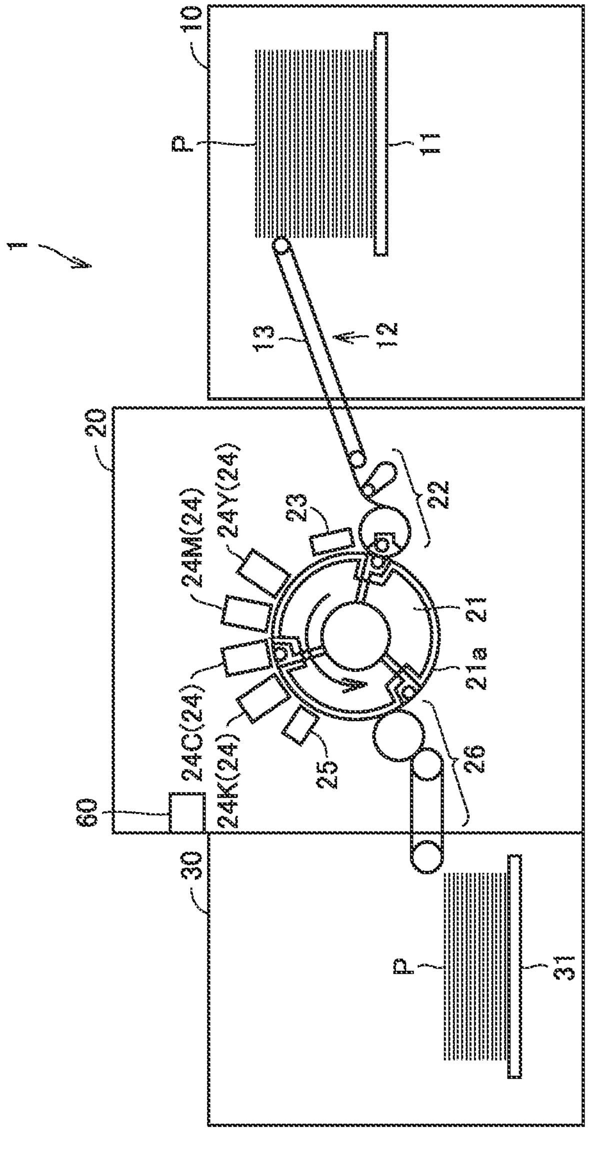
FIG. 1 shows an image forming apparatus according to Embodiment 1.

Hereinafter, one or more embodiments of the present invention will be described with reference to the drawings. However, the scope of the invention is not limited to the disclosed embodiments.

In the following, the same parts and components are denoted by the same reference characters. They have the same names and functions as well. Therefore, a detailed description thereof is not herein repeated. Embodiments and modifications described below may selectively be combined as appropriate.

Embodiment 1

<A. Overview of Image Forming Apparatus>

Referring to FIG. 1, an overview of an image forming apparatus according to Embodiment 1 is described.

FIG. 1 shows the image forming apparatus according to Embodiment 1. Referring to FIG. 1, image forming apparatus 1 according to Embodiment 1 is an inkjet printer that forms an image on a recording medium P by ejecting ink thereto. Image forming apparatus 1 may be a monochrome inkjet printer or a color inkjet printer. For instance, image forming apparatus 1 according to the present embodiment is a color inkjet printer that ejects inks of four colors: yellow, magenta, cyan, and black.

Liquid-based ink is used as the ink. For instance, gel ink is used for image formation by image forming apparatus 1 according to the present embodiment. The gel ink contains a gelling agent, and has properties of being changed into gel or sol depending on the temperature, and being cured by energy radiation such as ultraviolet radiation. The ink contains a plurality of wax components that are different from each other in terms of melting point.

Image forming apparatus 1 includes a sheet feed section 10, an image forming section 20, a sheet ejection section 30, and a controller 60. In image forming apparatus 1, recording medium P stored in sheet feed section 10 is conveyed to image forming section 20, an image is formed on recording medium P in image forming section 20, and recording medium P on which the image is formed is conveyed to sheet ejection section 30. As recording medium P, any of various media can be used, such as sheet of paper and sheet-shaped resin that allow ink ejected on their surface to be cured.

Sheet feed section 10 conveys recording medium P to image forming section 20. Sheet feed section 10 includes a sheet feed tray 11 on which recording medium P is placed, and a feed section 12 that feeds recording medium P from sheet feed tray 11 to image forming section 20. Feed section 12 has a loop-shaped belt 13 supported by two rollers. With recording medium P placed on belt 13, the rollers are rotated to convey recording medium P from sheet feed tray 11 to image forming section 20.

Image forming section 20 forms an image on recording medium P. Image forming section 20 includes a conveyance drum 21, a first transport unit 22, a sheet heating section 23, an ink head unit 24, a fixing section 25, and a second transport unit 26.

Conveyance drum 21 is a member that conveys recording medium P. Conveyance drum 21 has a columnar shape. With recording medium P held on a conveyance surface 21*a* that is the outer circumferential surface of conveyance drum 21, conveyance drum 21 is rotated about a rotational axis extending perpendicularly to the plane of FIG. 1, to convey recording medium P in a conveyance direction along conveyance surface 21*a*. Conveyance drum 21 is connected to a motor for rotating conveyance drum 21, and rotated by an angle proportional to the rotation amount of the motor.

First transport unit 22 is a unit that receives recording medium P conveyed from sheet feed section 10 and passes recording medium P to conveyance drum 21. First transport unit 22 is located between feed section 12 and conveyance drum 21.

Sheet heating section 23 is a mechanism that heats recording medium P. Sheet heating section 23 is located between first transport unit 22 and ink head unit 24. Sheet heating section 23 heats recording medium P so as to cause the temperature of recording medium P to fall within a predetermined range.

Ink head unit 24 is a unit that ejects ink to recording medium P to thereby form an image. Ink head unit 24 has an ink head that ejects ink. Ink head unit 24 is disposed in such a manner that a surface of the ink head from which ink is ejected faces conveyance surface 21*a*. Ink head unit 24 ejects ink to recording medium P at an appropriate timing depending on rotation of conveyance drum 21 on which recording medium P is held, to thereby form an image on recording medium P.

Ink head unit 24 is provided for each ink color. In the present embodiment, an ink head unit 24Y that ejects yellow ink, an ink head unit 24M that ejects magenta ink, an ink head unit 24C that ejects cyan ink, and an ink head unit 24K that ejects black ink, are arranged in this order from the upstream side of a conveyance path for recording medium P.

In the following, ink head unit 24Y, ink head unit 24M, ink head unit 24C, and ink head unit 24K that are described without being distinguished from each other are referred to as "ink head unit 24."

Fixing section 25 applies energy radiation such as ultraviolet radiation to recording medium P placed on conveyance drum 21, to thereby cure the ink on recording medium P and fix the ink thereon.

Second transport unit 26 is a unit that receives recording medium P conveyed by conveyance drum 21 and passes recording medium P to sheet ejection section 30.

Sheet ejection section 30 includes a plate-shaped sheet ejection tray 31 on which recording medium P having an image formed thereon and conveyed from image forming section 20 is placed.

<B. Example Hardware Configuration of Image Forming Apparatus 1>

Figure 2:
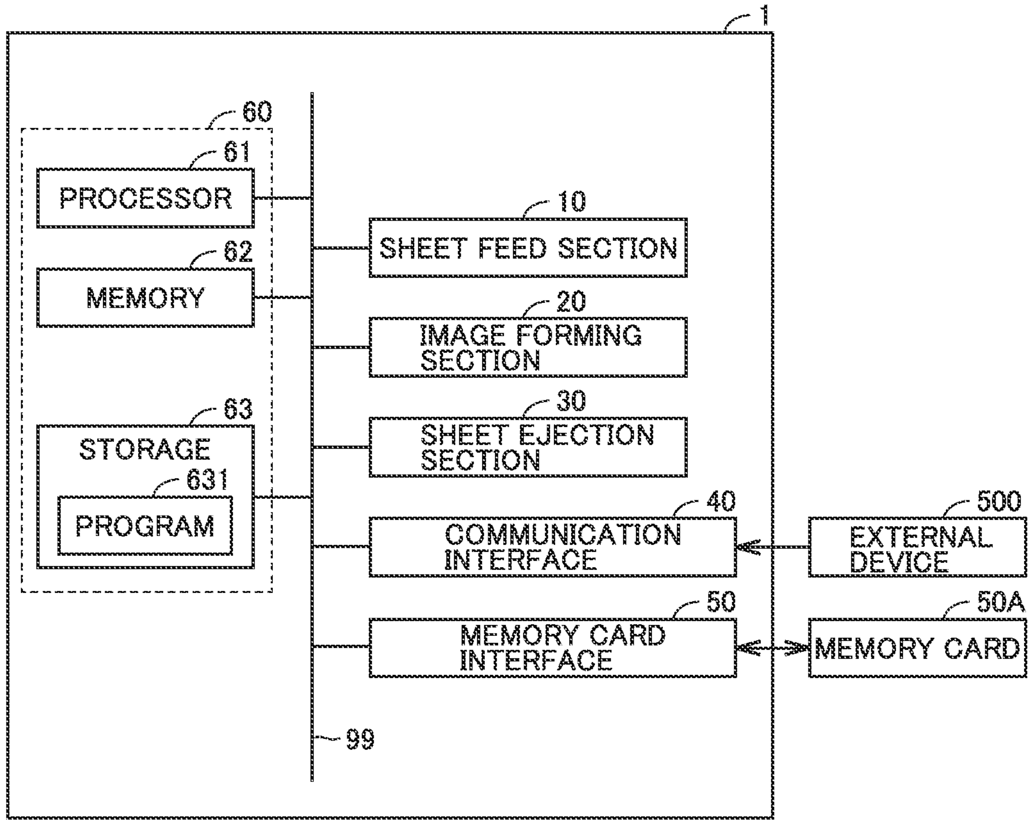
FIG. 2 shows an example of a hardware configuration of the image forming apparatus according to Embodiment 1.

Referring to FIG. 2, a hardware configuration of image forming apparatus 1 according to Embodiment 1 is described.

FIG. 2 shows an example of a hardware configuration of the image forming apparatus according to Embodiment 1. Image forming apparatus 1 further includes a communication interface 40 and a memory card interface 50, in addition to sheet feed section 10, image forming section 20, sheet ejection section 30, and controller shown in FIG. 1. Sheet feed section 10, image forming section 20, sheet ejection section 30, communication interface 40, memory card interface 50, and controller 60 are electrically connected to each other through a bus 99.

Communication interface 40 is in charge of transmission and reception of data between image forming apparatus 1 and an external device 500. External device 500 is a terminal device used by a user, for example. For instance, communication interface 40 receives image data for printing, from external device 500.

Controller 60 includes a processor 61, a memory 62, and a storage 63. Processor 61 is configured as a CPU (Central Processing Unit) or an MPU (Micro-Processing Unit), for example. Memory 62 is configured as a volatile storage device such as DRAM (Dynamic Random Access Memory) or SRAM (Static Random Access Memory), for example. Storage 63 is configured as a nonvolatile storage device such as SSD (Solid State Drive) or flash memory, for example. Storage 63 stores a program 631. Program 631 includes computer-readable instructions for controlling image forming apparatus 1. Processor 61 deploys, on memory 62, program 631 stored in storage 63, and executes the program to thereby implement various types of processes according to the present embodiment.

Program 631 is provided in the form of being stored in a storage medium such as memory card 50A. Program 631 is read from memory card 50A and installed in image forming apparatus 1 by memory card interface 50.

Program 631 may also be provided in the form of being incorporated in an arbitrary program, as a part of the arbitrary program, rather than provided in the form of a single separate program. In this case, processes according to the present embodiment are implemented in cooperation with the arbitrary program. Such a program that does not include some modules also falls within the scope of image forming apparatus 1 according to the present embodiment. A part or the whole of functions provided by program 631 may be implemented by dedicated hardware.

Instead of installing, in image forming apparatus 1, program 631 stored in memory card 50A, a program downloaded from a distribution server or the like may be installed in image forming apparatus 1.

<C. Configuration of Ink Head Unit 24 of Image Forming Apparatus 1>

Figure 3:
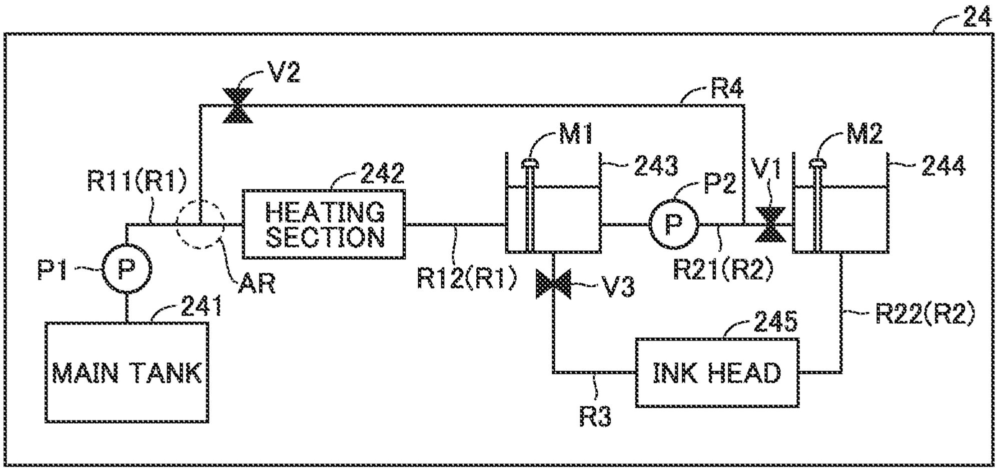
FIG. 3 shows a configuration of an ink head unit according to Embodiment 1.
Figure 4:
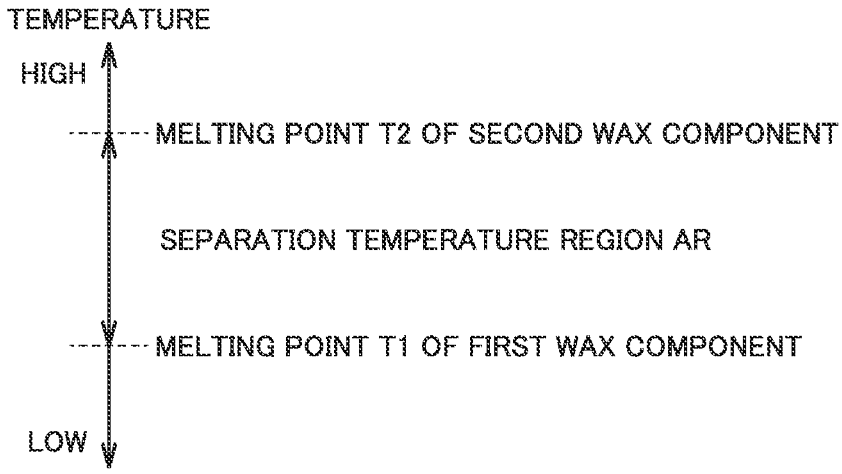
FIG. 4 shows the temperature of a separation temperature region.

Referring to FIGS. 3 and 4, ink head unit 24 according to Embodiment 1 is described. FIG. 3 shows a configuration of the ink head unit according to Embodiment 1. FIG. 4 shows the temperature of a separation temperature region.

Referring to FIG. 3, ink head unit 24 includes a main tank 241, a heating section 242, a first storage tank 243, a second storage tank 244, an ink head 245, a supply pump P1, a circulation pump P2, a supply valve V1, a circulation valve V2, a discharge valve V3, a first sensor M1, a second sensor M2, and an ink channel. The ink channel is a channel through which ink flows. The ink channel includes a first supply channel R1, a second supply channel R2, a maintenance channel R3, and a circulation channel R4.

First supply channel R1 is a channel for supplying ink from main tank 241 to first storage tank 243. Main tank 241 stores ink. First storage tank 243 stores ink supplied from main tank 241. Heating section 242 is provided in first supply channel R1. First supply channel R1 includes a channel R11 connecting main tank 241 to heating section 242, and a channel R12 connecting heating section 242 to first storage tank 243.

In channel R11 of first supply channel R1, supply pump P1 is provided. Supply pump P1 is controlled by controller 60 described above. Supply pump P1 is driven to supply ink from main tank 241 to heating section 242.

Heating section 242 heats ink supplied from main tank 241. Specifically, heating section 242 heats ink supplied from main tank 241 to melt the ink into a sol state. Accordingly, the viscosity of the ink is increased. Supply pump P1 is driven to cause ink heated by heating section 242 to be supplied through channel R12 to first storage tank 243, and stored in first storage tank 243.

First sensor M1 detects the amount of ink in first storage tank 243. First sensor M1 may be a liquid level sensor that measures the level of the liquid surface of ink in first storage tank 243, or a weight sensor that measures the weight of ink in first storage tank 243.

First sensor M1 outputs the result of the detection to controller 60. When controller 60 determines, based on the result of the detection received from first sensor M1, that the amount of ink in first storage tank 243 is less than a reference value, controller 60 gives an instruction to drive supply pump P1. The reference value is a value smaller than a first threshold value by a predetermined amount.

Second supply channel R2 is a channel for supplying ink from first storage tank 243 to ink head 245. In second supply channel R2, second storage tank 244 is provided that stores ink supplied from first storage tank 243. Second supply channel R2 includes a channel R21 connecting first storage tank 243 to second storage tank 244, and a cannel R22 connecting second storage tank 244 to ink head 245.

In channel R21 of second supply channel R2, supply valve V1 is provided. Supply valve V1 is a control valve that controls flow of ink from first storage tank 243 to second storage tank 244. Opening and closing of supply valve V1 is controlled by controller 60. Supply valve V1 is controlled to be opened only when ink is supplied from first storage tank 243 to second storage tank 244, and controlled to be closed otherwise.

In channel R21 of second supply channel R2, circulation pump P2 is further provided. Circulation pump P2 is controlled by controller 60. While supply valve V1 is opened, circulation pump P2 is driven to supply ink from first storage tank 243 to second storage tank 244. While circulation valve V2 described later herein is opened, circulation pump P2 is driven to supply ink in second supply channel R2 to a part, located between main tank 241 and heating section 242, of first supply channel R1.

Second sensor M2 detects the amount of ink in second storage tank 244. Second sensor M2 may be a liquid level sensor that measures the level of the liquid surface of ink in second storage tank 244, or a weight sensor that measures the weight of ink in second storage tank 244.

Second sensor M2 outputs the result of the detection to controller 60. When controller 60 determines, based on the result of the detection received from second sensor M2, that the amount of ink in second storage tank 244 is less than a second threshold value, controller 60 opens supply valve V1 and gives an instruction to drive circulation pump P2. Thus, ink is supplied from first storage tank 243 to second storage tank 244.

Ink head unit 24 includes second storage tank 244, and therefore, shortage of ink ejected from ink head 245 can be suppressed.

Ink head 245 ejects ink, based on an instruction from controller 60, to form an image on recording medium P.

Maintenance channel R3 connects ink head 245 to first storage tank 243. Discharge valve V3 is provided in maintenance channel R3. Discharge valve V3 is a control valve that controls flow of ink from second storage tank 244 to first storage tank 243 through ink head 245. Opening and closing of discharge valve V3 is controlled by controller 60. Discharge valve V3 is controlled to be opened only for a maintenance time of ink head 245, and controlled to be closed otherwise. The maintenance time refers to a period of time in which air bubbles having entered ink head 245 are removed. Controller 60 opens discharge valve V3 for the maintenance time. Thus, ink flows from second storage tank 244 to first storage tank 243 through ink head 245, which enables removal of air bubbles having entered ink head 245.

Circulation channel R4 is a channel for returning ink in second supply channel R2 to a part, located between main tank 241 and heating section 242, of first supply channel R1. Circulation channel R4 is a channel that does not pass through ink head 245. In the present embodiment, circulation channel R4 causes ink in channel R21 of second supply channel R2 to be returned back to channel R11.

In circulation channel R4, circulation valve V2 is provided. Circulation valve V2 is a control valve that controls flow of ink from second supply channel R2 to a part, located between main tank 241 and heating section 242, of first supply channel R1. Opening and closing of circulation valve V2 is controlled by controller 60. Circulation valve V2 is controlled to be opened only when ink in second supply channel R2 is returned back to a part, located between main tank 241 and heating section 242, of first supply channel R1, and controlled to be closed otherwise. In the following, an operation of returning ink in second supply channel R2 back to a part, located between main tank 241 and heating section 242, of first supply channel R1, is referred to as "circulation operation."

When either: a power supply for image forming apparatus 1 is turned on; or the circulation operation is not performed for a first predetermined time or more, is satisfied, controller 60 opens circulation valve V2 and gives an instruction to drive circulation pump P2. In other words, a) controller 60 may open circulation valve V2 and give an instruction to drive circulation pump P2 when a power supply for image forming apparatus 1 is turned on, and controller 60 may open circulation valve V2 and give an instruction to drive circulation pump P2 when the circulation operation is not performed for a first predetermined time or more, or b) controller 60 may open circulation valve V2 and give an instruction to drive circulation pump P2 only when a power supply for image forming apparatus 1 is turned on, or c) controller 60 may open circulation valve V2 and give an instruction to drive circulation pump P2 only when the circulation operation is not performed for a first predetermined time or more.

The first predetermined time is defined, based on the time taken for a wax component having a high melting point in the ink to start being separated, in a separation temperature region AR described later herein. Circulation valve V2 is opened and circulation pump P2 is driven to cause ink in second supply channel R2 to flow into a part, located between main tank 241 and heating section 242, of first supply channel R1.

Separation temperature region AR shown in the drawing is a region which is included in first supply channel R1 and in which there is a high possibility that ink components become non-uniform due to heat transferred from heating section 242. Separation temperature region AR is one example of the region "at least a part of first supply channel R1" in the present disclosure. As shown in FIG. 4, the temperature of separation temperature region AR is more than or equal to a first temperature T1 that is the melting point of a first wax component lowest in melting point among a plurality of wax components in ink, and less than a second temperature T2 that is the melting point of a second wax component highest in melting point among the plurality of wax components in the ink.

Generally, when ink remains for a long time in such separation temperature region AR, a wax component having a lower melting point in the ink is likely to start melting to flow, while a wax component having a higher melting point in the ink is separated and accumulated in channel R11, which results in non-uniformity of ink components. When ink components become non-uniform, the ink channel and/or ink head 245 is clogged, which results in a possibility of failure of image forming apparatus 1. Moreover, non-uniformity of ink components may result in a possibility that the image quality of printed materials is degraded.

In contrast, in image forming apparatus 1 according to Embodiment 1, the circulation operation is performed when either: a power supply for image forming apparatus 1 is turned on; or the circulation operation is not performed for the first predetermined time or more, is satisfied. The circulation operation causes ink in second supply channel R2, i.e., high-temperature ink after being melted, to flow into a part, located between main tank 241 and heating section 242, of first supply channel R1. Therefore, a wax component having a high melting point in the ink staying in separation temperature region AR is likely to be melt and flow, which makes ink components uniform. Thus, image forming apparatus 1 according to the present embodiment can suppress the non-uniformity of ink components due to heating section 242.

Circulation channel R4 is a channel that does not pass through ink head 245, and therefore, both the circulation operation and ejection of ink from ink head 245 can be performed simultaneously. It is therefore unnecessary to stop, for performing the circulation operation, ejection of ink from ink head 245, and accordingly reduction of the productivity of printed materials can be prevented.

In second supply channel R2, second storage tank 244 storing ink that has been supplied from first storage tank 243 and that is to be supplied to ink head 245 is provided. Therefore, supply valve V1 can be kept closed even during printing, and therefore, the circulation operation can be done even during printing. It is thus unnecessary to stop, for performing the circulation operation, ejection of ink from ink head 245, and accordingly, reduction of the productivity of printed materials can be prevented.

Ink head unit 24 may at least include main tank 241, heating section 242, first storage tank 243, ink head 245, first supply channel R1, second supply channel R2, and circulation channel R4. For a configuration where ink head unit 24 does not include second storage tank 244, the channel connecting first storage tank 243 to ink head 245 serves as second supply channel R2.

<D. Process for Controlling Flow of Ink by Image Forming Apparatus 1>

Figure 5:
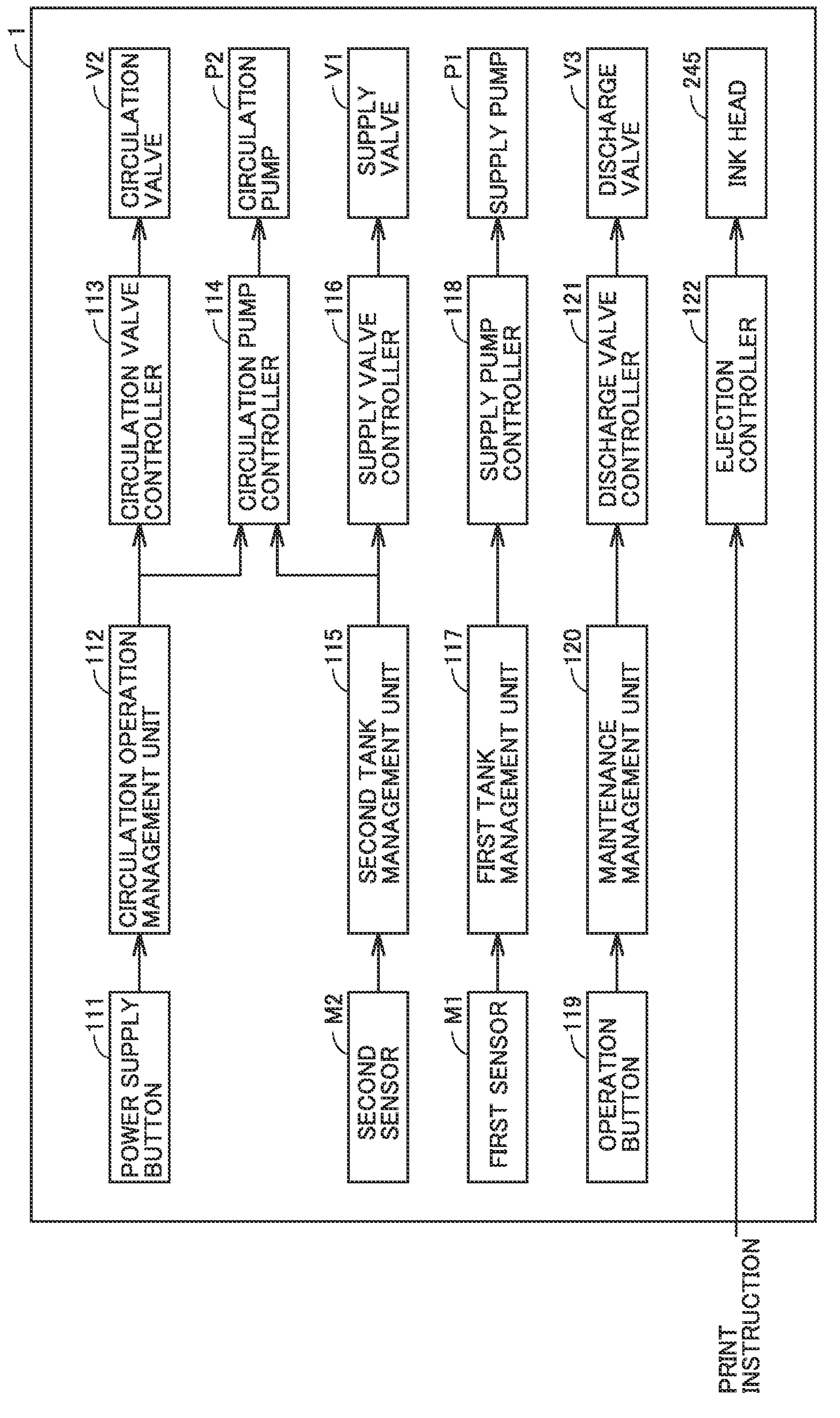
FIG. 5 shows an overview of a process for controlling flow of ink in the image forming apparatus according to Embodiment 1.
Figure 6:
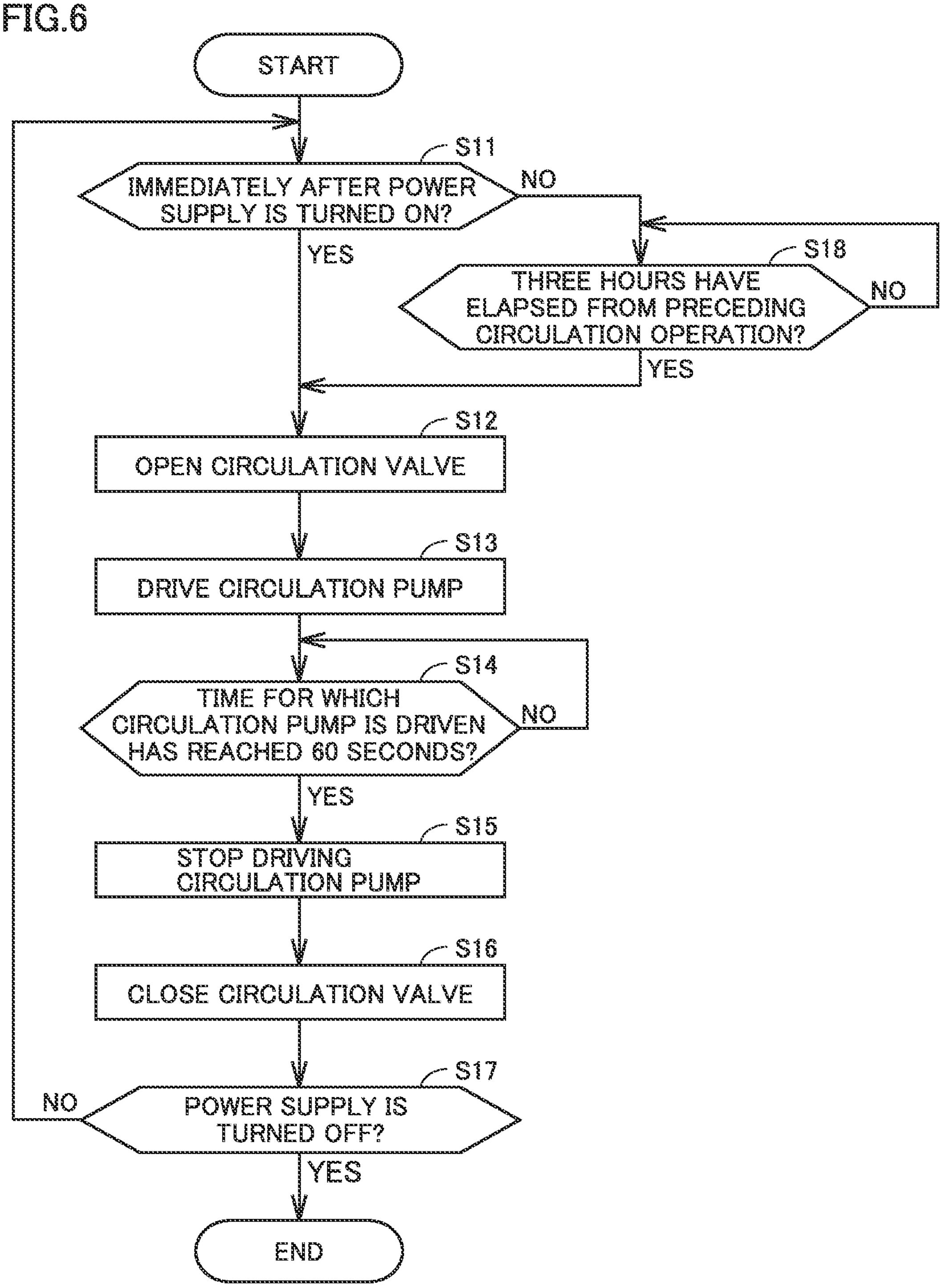
FIG. 6 is a flowchart showing a procedure of a circulation process performed by the image forming apparatus according to Embodiment 1.

Referring to FIGS. 5 and 6, a process for controlling flow of ink in image forming apparatus 1 according to Embodiment 1 is described.

(D1: Process Overview)

FIG. 5 shows an overview of the process for controlling flow of ink in the image forming apparatus according to Embodiment 1. Image forming apparatus 1 includes a power supply button 111, a circulation operation management unit 112, a circulation valve controller 113, a circulation pump controller 114, a second tank management unit 115, a supply valve controller 116, a first tank management unit 117, a supply pump controller 118, an operation button 119, a maintenance management unit 120, a discharge valve controller 121, an ejection controller 122, circulation valve V2, circulation pump P2, supply valve V1, supply pump P1, discharge valve V3, ink head 245, first sensor M1, and second sensor M2.

Circulation operation management unit 112, circulation valve controller 113, circulation pump controller 114, second tank management unit 115, supply valve controller 116, first tank management unit 117, supply pump controller 118, maintenance management unit 120, discharge valve controller 121, and ejection controller 122 are implemented through execution of program 631 by aforementioned processor 61.

Initially, a circulation process for controlling the aforementioned circulation operation is described. Power supply button 111 is a button for turning on a power supply for image forming apparatus 1. When power supply button 111 is pressed, circulation operation management unit 112 determines that the power supply for image forming apparatus 1 is turned on. Circulation operation management unit 112 manages the circulation operation. Circulation valve controller 113 controls opening and closing of circulation valve V2. Circulation pump controller 114 controls driving of circulation pump P2.

When a condition for starting the circulation operation is satisfied, circulation operation management unit 112 outputs, to circulation valve controller 113, an instruction to open circulation valve V2. The condition for starting the circulation operation may be a condition that a power supply for image forming apparatus 1 is turned on, or a condition that the circulation operation is not performed for the first predetermined time or more. In other words, circulation operation management unit 112 outputs, to circulation valve controller 113, an instruction to open circulation valve V2, when either: a power supply for image forming apparatus 1 is turned on; or the circulation operation is not performed for the first predetermined time or more, is satisfied.

Following the instruction from circulation operation management unit 112, circulation valve controller 113 opens circulation valve V2, and outputs, to circulation operation management unit 112, a signal indicating that circulation valve V2 is opened. Receiving the signal indicating that circulation valve V2 is opened, circulation operation management unit 112 outputs, to circulation pump controller 114, an instruction to start driving circulation pump P2. Following the instruction from circulation operation management unit 112, circulation pump controller 114 drives circulation pump P2 and, while circulation pump P2 is being driven, circulation pump controller 114 keeps outputting, to circulation operation management unit 112, a signal indicating that circulation pump P2 is being driven. Circulation valve V2 is opened and circulation pump P2 is driven to cause ink in second supply channel R2, i.e., high-temperature ink after being melted, to flow into a part, located between main tank 241 and heating section 242, of first supply channel R1.

Based on the signal which is received from circulation pump controller 114 and which indicates that circulation pump P2 is being driven, circulation operation management unit 112 counts the driving time for which circulation pump P2 is driven. When the driving time of circulation pump P2 reaches 60 seconds, circulation operation management unit 112 outputs, to circulation pump controller 114, an instruction to stop driving circulation pump P2. Following the instruction from circulation operation management unit 112, circulation pump controller 114 stops driving circulation pump P2, and outputs, to circulation operation management unit 112, a signal indicating that circulation pump P2 is stopped from being driven.

Receiving the signal indicating that circulation pump P2 is stopped from being driven, circulation operation management unit 112 outputs, to circulation valve controller 113, an instruction to close circulation valve V2. Following the instruction from circulation operation management unit 112, circulation valve controller 113 closes circulation valve V2, and outputs, to circulation operation management unit 112, a signal indicating that circulation valve V2 is closed.

Thus, the circulation operation is performed for 60 seconds, when either: a power supply for image forming apparatus 1 is turned on; or the circulation operation is not performed for the first predetermined time or more, is satisfied, and therefore, non-uniformity of ink components is suppressed. The driving time of circulation pump P2 is not limited to 60 seconds, but may be a time that is enough for suppressing the non-uniformity of ink components. The driving time of circulation pump P2 may be shorter than 60 seconds, or more than 60 seconds.

Next, a process for controlling an operation of supplying ink to second storage tank 244 is described. Second tank management unit 115 manages the amount of ink in second storage tank 244. Supply valve controller 116 controls opening and closing of supply valve V1.

When a condition for starting the operation of supplying ink to second storage tank 244 is satisfied, second tank management unit 115 outputs, to supply valve controller 116, an instruction to open supply valve V1. The condition for starting the operation of supplying ink to second storage tank 244 is a condition that the amount of ink in second storage tank 244 is less than the second threshold value. Based on the result of detection received from second sensor M2, second tank management unit 115 determines whether or not the amount of ink in second storage tank 244 is less than the second threshold value.

Following the instruction from second tank management unit 115, supply valve controller 116 opens supply valve V1, and outputs, to second tank management unit 115, a signal indicating that supply valve V1 is opened. Receiving the signal indicating that supply valve V1 is opened, second tank management unit 115 outputs, to circulation pump controller 114, an instruction to start driving circulation pump P2. Following the instruction from second tank management unit 115, circulation pump controller 114 drives circulation pump P2 and, while circulation pump P2 is being driven, circulation pump controller 114 keeps outputting, to second tank management unit 115, a signal indicating that circulation pump P2 is being driven. Supply valve V1 is opened and circulation pump P2 is driven to cause ink to be supplied from first storage tank 243 to second storage tank 244.

When the amount of ink in second storage tank 244 is more than or equal to the second threshold value, second tank management unit 115 outputs, to circulation pump controller 114, an instruction to stop driving circulation pump P2. Following the instruction from second tank management unit 115, circulation pump controller 114 stops driving circulation pump P2, and outputs, to second tank management unit 115, a signal indicating that circulation pump P2 is stopped from being driven.

Receiving the signal indicating that circulation pump P2 is stopped from being driven, second tank management unit 115 outputs, to supply valve controller 116, an instruction to close supply valve V1. Following the instruction from second tank management unit 115, supply valve controller 116 closes supply valve V1, and outputs, to second tank management unit 115, a signal indicating that supply valve V1 is closed.

Thus, when the amount of ink in second storage tank 244 is less than the second threshold value, ink is supplied from first storage tank 243 to second storage tank 244. Shortage of ink ejected from ink head 245 can therefore be suppressed.

Next, a process for controlling an operation of supplying ink to first storage tank 243 is described. First tank management unit 117 manages the amount of ink in first storage tank 243. Supply pump controller 118 controls driving of supply pump P1.

When a condition for starting an operation of supplying ink to first storage tank 243 is satisfied, first tank management unit 117 outputs, to supply pump controller 118, an instruction to start driving supply pump P1. The condition for starting the operation of supplying ink to first storage tank 243 is a condition that the amount of ink in first storage tank 243 is less than a reference value. Based on the result of detection received from first sensor M1, first tank management unit 117 determines whether or not the amount of ink in first storage tank 243 is less than the reference value.

Following the instruction from first tank management unit 117, supply pump controller 118 drives supply pump P1 and, while supply pump P1 is being driven, supply pump controller 118 keeps outputting, to first tank management unit 117, a signal indicating that supply pump P1 is being driven. Supply pump P1 is driven to cause ink to be supplied from main tank 241 to first storage tank 243 through heating section 242.

Based on the result of detection received from first sensor M1, first tank management unit 117 determines whether or not the amount of ink in first storage tank 243 has reached the first threshold value. When the amount of ink in first storage tank 243 has reached the first threshold value, first tank management unit 117 outputs, to supply pump controller 118, an instruction to stop driving supply pump P1. Following the instruction from first tank management unit 117, supply pump controller 118 stops driving supply pump P1 and outputs, to first tank management unit 117, a signal indicating that supply pump P1 is stopped from being driven.

Thus, when the amount of ink in first storage tank 243 is less than the reference value, ink is supplied from main tank 241 to first storage tank 243 through heating section 242. Therefore, there is no exhaustion of ink in first storage tank 243, and ink can be supplied immediately from first storage tank 243 to second storage tank 244, when the amount of ink in second storage tank 244 becomes less than the second threshold value.

Next, a process for controlling a maintenance operation for ink head 245 is described. The maintenance operation refers to an operation of causing ink to flow from second storage tank 244 to first storage tank 243 through ink head 245. Maintenance management unit 120 manages the maintenance operation for ink head 245. Discharge valve controller 121 controls opening and closing of discharge valve V3.

When a condition for starting the maintenance operation for ink head 245 is satisfied, maintenance management unit 120 outputs, to discharge valve controller 121, an instruction to open discharge valve V3. The condition for starting the maintenance operation for ink head 245 is a condition that operation button 119 is pressed, for example.

Following the instruction from maintenance management unit 120, discharge valve controller 121 opens discharge valve V3 and outputs, to maintenance management unit 120, a signal indicating that discharge valve V3 is opened. Discharge valve V3 is opened to cause ink to flow from second storage tank 244 to first storage tank 243 through ink head 245.

When a predetermined time defined as a maintenance time has elapsed from reception of the signal indicating that discharge valve V3 is opened, maintenance management unit 120 outputs, to discharge valve controller 121, an instruction to close discharge valve V3. Following the instruction from maintenance management unit 120, discharge valve controller 121 closes discharge valve V3 and outputs, to maintenance management unit 120, a signal indicating that discharge valve V3 is closed.

Thus, when the condition for starting the maintenance operation for ink head 245 is satisfied, ink flows from second storage tank 244 to first storage tank 243 through ink head 245. Air bubbles having entered ink head 245 can therefore be removed.

Next, a process for controlling an operation of ejecting ink is described. Ejection controller 122 controls ejection from ink head 245. Receiving a print instruction, ejection controller 122 controls ejection from ink head 245 based on image data included in the print instruction. Thus, ink is ejected from ink head 245 to form an image on recording medium P.

(D2: Process Procedure)

FIG. 6 is a flowchart showing a procedure of the circulation process by the image forming apparatus according to Embodiment 1. The circulation process shown in FIG. 6 is performed by aforementioned processor 61.

In step S11, processor 61 determines whether or not it is immediately after a power supply for image forming apparatus 1 is turned on. When it is immediately after the power supply for image forming apparatus 1 is turned on (YES in step S11), processor 61 proceeds to step S12.

In step S12, processor 61 opens circulation valve V2.

In step S13, processor 61 drives circulation pump P2.

In step S14, processor 61 determines whether or not the driving time for which circulation pump P2 is driven has reached 60 seconds or not. When the driving time for which circulation pump P2 is driven has reached 60 seconds (YES in step S14), processor 61 proceeds to step S15.

In step S15, processor 61 stops driving circulation pump P2.

In step S16, processor 61 closes circulation valve V2.

In step S17, processor 61 determines whether or not the power supply for image forming apparatus 1 is turned off. When the power supply for image forming apparatus 1 is turned off (YES in step S17), processor 61 ends the circulation process. In contrast, when the power supply for image forming apparatus 1 is not turned off (NO in step S17), processor 61 returns to step S11.

When it is not immediately after the power supply for image forming apparatus 1 is turned on (NO in step S11), processor 61 proceeds to step S18.

In step S18, processor 61 determines whether or not three hours have elapsed from the preceding circulation operation. Three hours are one example of the aforementioned "first predetermined time." When three hours have elapsed from the preceding circulation operation (YES in step S18), processor 61 proceeds to step S12.

In both of the case where the power supply for image forming apparatus 1 is turned on, and the case where three hours have elapsed from the preceding circulation operation, the circulation process shown in FIG. 6 causes the circulation operation to be performed. The circulation operation may be performed only when the power supply for image forming apparatus 1 is turned on, or only when three hours have elapsed from the preceding circulation operation. The first predetermined time is not limited to three hours, but may be the time defined, based on the time taken for a wax component having a high melting point in the ink to start being separated in separation temperature region AR.

Thus, image forming apparatus 1 according to Embodiment 1 includes main tank 241, heating section 242, first storage tank 243, ink head 245, first supply channel R1, second supply channel R2, and circulation channel R4, and enables ink in second supply channel R2, i.e., high-temperature ink after being melted, to be returned to a part, located between main tank 241 and heating section 242, of first supply channel R1. Accordingly, a high-melting-point wax component in the ink staying in separation temperature region AR between main tank 241 and heating section 242 is easily melted to flow, which makes ink components uniform. Image forming apparatus 1 according to the present embodiment can therefore suppress non-uniformity of ink components due to heating section 242.

In the above-described example, it is supposed that the ink contains a plurality of wax components different from each other in terms of melting point. If respective melting points of the wax components have a certain range such as a range from X degrees to Y degrees ($X<Y$), the ink may contain only a single kind of wax component. Generally, wax components contained in ink are naturally-derived components, and therefore, their melting points have a certain range. Therefore, even in a single kind of wax component, a part of the wax component may be melted at a relatively low temperature (X degrees, for example) while the remaining part thereof may be melted only at a relatively high temperature (Y degrees, for example). If ink contains such a wax component having a certain range of its melting point, a part of the wax component may be easily melted to flow while the remaining part thereof may be separated to accumulate in channel R11, even when the ink contains only the single kind of wax component. Thus, ink components may become non-uniform, due to heating section 242. Image forming apparatus 1 according to the present embodiment can return ink in second supply channel R2 back to a part, located between main tank 241 and heating section 242, of first supply channel R1, and therefore can suppress such non-uniformity of ink components due to heating section 242.

Embodiment 2

Image forming apparatus 1 according to Embodiment 1 is configured to perform the circulation operation when either: a power supply for image forming apparatus 1 is turned on; or the circulation operation is not performed for the first predetermined time or more, is satisfied. In the following, the case where either: a power supply for the image forming apparatus is turned on; or the circulation operation is not performed for the first predetermined time or more, is satisfied, is also referred to as "normal case." In the following, the circulation operation performed in the normal case is also referred to as "the circulation operation in the normal condition." An image forming apparatus according to Embodiment 2 is configured to perform the circulation operation also in the case where an anomaly occurs, in addition to the normal case. In the following, the circulation operation performed in the case where an anomaly occurs is also referred to as "the circulation operation in the anomaly condition."

Figure 7:
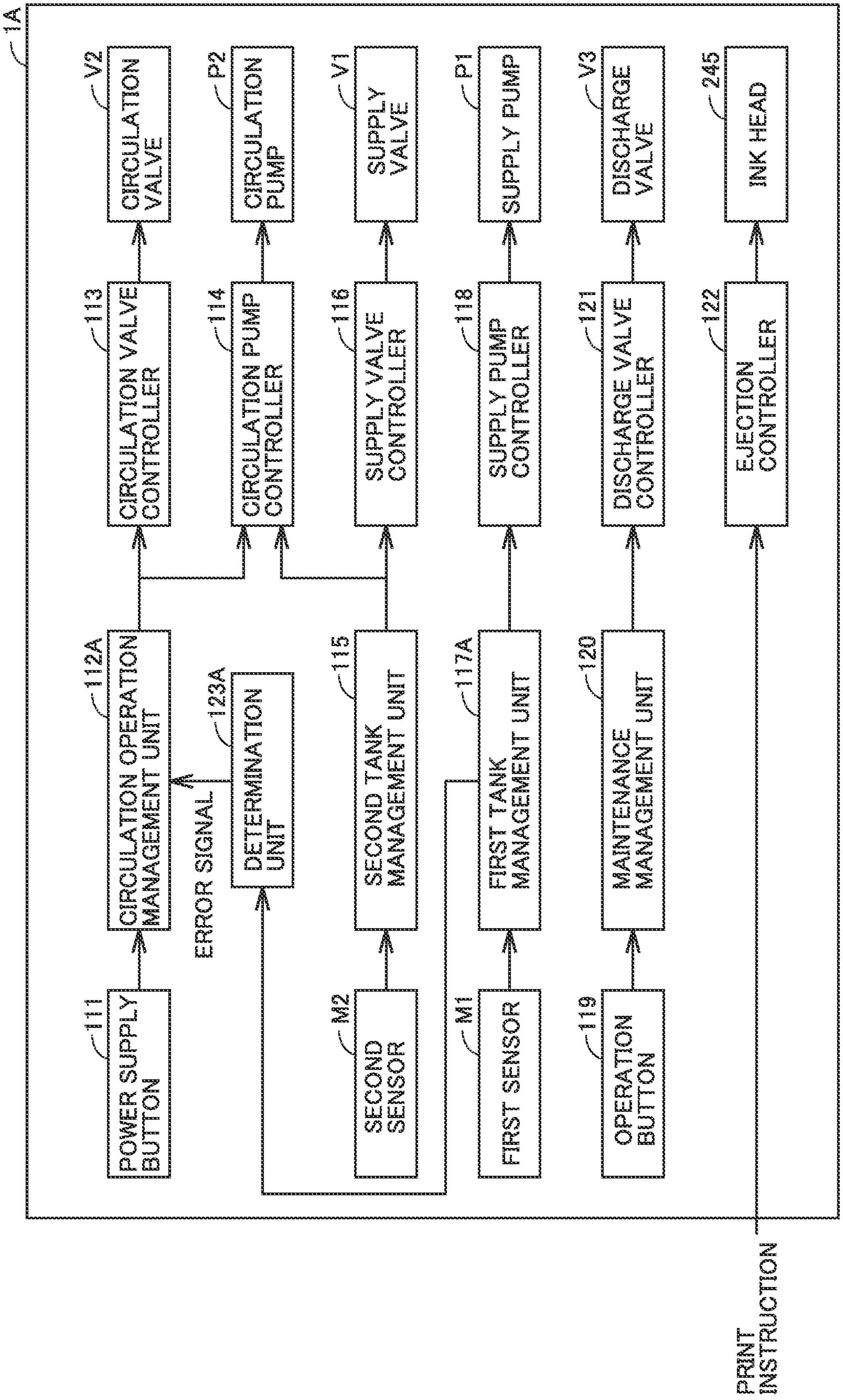
FIG. 7 shows an overview of a process for controlling flow of ink in an image forming apparatus according to Embodiment 2.

FIG. 7 shows an overview of the process for controlling flow of ink in the image forming apparatus according to Embodiment 2. Image forming apparatus 1A according to Embodiment 2 has a similar configuration to image forming apparatus 1 according to Embodiment 1 described above with reference to FIGS. 1 to 4, and therefore, the same components are denoted by the same reference characters, and the description thereof is not herein repeated. Moreover, similar components in image forming apparatus 1A according to Embodiment 2 shown in FIG. 7 and image forming apparatus 1 according to Embodiment 1 described above with reference to FIG. 5 are denoted by the same reference characters, and the description thereof is not herein repeated.

Image forming apparatus 1A according to Embodiment 2 shown in FIG. 7 differs from image forming apparatus 1 according to Embodiment 1 described above with reference to FIG. 5 in that image forming apparatus 1A includes a circulation operation management unit 112A and first tank management unit 117A instead of circulation operation management unit 112 and first tank management unit 117, and further includes a determination unit 123A.

Circulation operation management unit 112A, first tank management unit 117A, and determination unit 123A are implemented through execution of program 631 by aforementioned processor 61.

First tank management unit 117A performs, in addition to the process performed by first tank management unit 117 as described above, outputs to determination unit 123A a signal indicating that supply pump P1 is being driven, while supply pump P1 is being driven.

Determination unit 123A determines whether or not an anomaly occurs. Specifically, when the amount of ink in first storage tank 243 does not reach the first threshold value within the second predetermined time from when supply pump P1 is driven, determination unit 123A determines that an anomaly occurs.

For instance, based on the signal which is received from first tank management unit 117A and which indicates that supply pump P1 is being driven, determination unit 123A counts the driving time for which supply pump P1 is driven. When the driving time for which supply pump P1 is driven reaches the second predetermined time, determination unit 123A determines that an anomaly occurs.

The second predetermined time is defined, based on the time taken for the amount of ink in first storage tank 243 to reach the first threshold value, from when supply pump P1 starts being driven, while first supply channel R1 not being clogged with ink. In other words, the second predetermined time is defined to be longer than the time taken for the amount of ink having a reference value in first storage tank 243 to reach the first threshold value when supply pump P1 is driven, while first supply channel R1 is not clogged with ink. Therefore, when determination unit 123A receives the signal, from first tank management unit 117A, indicating that supply pump P1 is being driven, while the driving time of supply pump P1 reaches the second predetermined time, it is expected that first supply channel R1 is be clogged with ink, i.e., ink components in the ink channel are non-uniform. Determination unit 123A therefore determines that an anomaly occurs, when the driving time of supply pump P1 reaches the second predetermined time. When determination unit 123A determines that an anomaly occurs, determination unit 123A outputs an error signal to circulation operation management unit 112A.

Like above-described circulation operation management unit 112, circulation operation management unit 112A outputs an instruction to perform the circulation operation, to circulation valve controller 113 and circulation pump controller 114, when either: a power supply for image forming apparatus 1A is turned on; or the circulation operation is not performed for the first predetermined time or more, is satisfied. In other words, in the normal case, circulation operation management unit 112A outputs instructions to circulation valve controller 113 and circulation pump controller 114, so that the circulation operation is performed.

Further, circulation operation management unit 112A outputs instructions to circulation valve controller 113 and circulation pump controller 114, so that the circulation operation is performed even when an anomaly occurs.

Specifically, when circulation operation management unit 112A receives an error signal from determination unit 123A, circulation operation management unit 112A outputs, to circulation valve controller 113, an instruction to open circulation valve V2.

Following the instruction from circulation operation management unit 112A, circulation valve controller 113 opens circulation valve V2, and outputs, to circulation operation management unit 112A, a signal indicating that circulation valve V2 is opened. Receiving the signal indicating that circulation valve V2 is opened, circulation operation management unit 112A outputs, to circulation pump controller 114, an instruction to start driving circulation pump P2. Following the instruction from circulation operation management unit 112A, circulation pump controller 114 drives circulation pump P2 and, while circulation pump P2 is being driven, circulation pump controller 114 keeps outputting, to circulation operation management unit 112A, the signal indicating that circulation pump P2 is being driven. Circulation valve V2 is opened and circulation pump P2 is driven to cause ink in second supply channel R2, i.e., high-temperature ink after being melted, to flow to a part, located between main tank 241 and heating section 242, of first supply channel R1.

Based on the signal which is received from circulation pump controller 114 and which indicates that circulation pump P2 is being driven, circulation operation management unit 112A counts the driving time for which circulation pump P2 is driven. When the driving time of circulation pump P2 reaches 120 seconds, circulation operation management unit 112A outputs, to circulation pump controller 114, an instruction to stop driving circulation pump P2. Following the instruction from circulation operation management unit 112A, circulation pump controller 114 stops driving circulation pump P2, and outputs, to circulation operation management unit 112A, a signal indicating that circulation pump P2 is stopped from being driven.

Receiving the signal indicating that circulation pump P2 is stopped from being driven, circulation operation management unit 112A outputs, to circulation valve controller 113, an instruction to close circulation valve V2. Following the instruction from circulation operation management unit 112A, circulation valve controller 113 closes circulation valve V2, and outputs, to circulation operation management unit 112A, a signal indicating that circulation valve V2 is closed.

Thus, while the driving time of circulation pump P2 in the normal case is 60 seconds, the driving time of circulation pump P2 is 120 seconds when determination unit 123A determines that an anomaly occurs. When determination unit 123A determines that an anomaly occurs, there is a high possibility that first supply channel R1 is clogged with ink and ink components are non-uniform in the ink channel. Circulation pump P2, however, is driven for a longer time than the normal case, so that the circulation operation in the anomaly condition is longer than the circulation operation in the normal condition. Accordingly, the non-uniformity of ink components is eliminated.

The driving time of circulation pump P2, when determination unit 123A determines that an anomaly occurs, is not limited to 120 seconds, but may be a time that is enough to eliminate the non-uniformity of ink components. The driving time of circulation pump P2, when determination unit 123A determines that an anomaly occurs, may be shorter than 120 seconds, or more than 120 seconds.

Moreover, the driving time of circulation pump P2, when determination unit 123A determines that an anomaly occurs, may be equal to the driving time of circulation pump P2 in the normal case, or shorter than the driving time of circulation pump P2 in the normal case.

Figure 8:
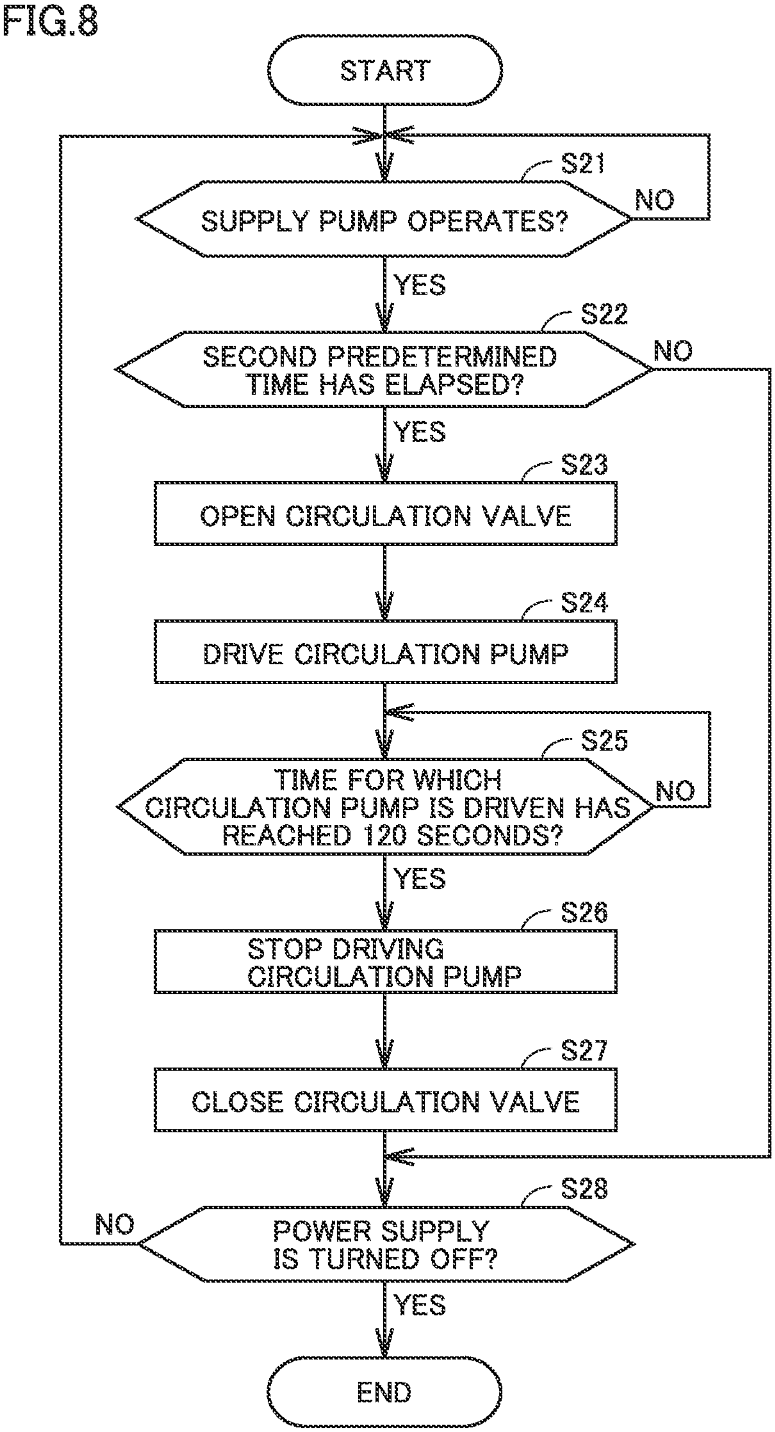
FIG. 8 is a flowchart showing a procedure of a circulation process in an anomaly condition that is performed by the image forming apparatus according to Embodiment 2.

FIG. 8 is a flowchart showing a procedure of a circulation process in the anomaly condition that is performed by the image forming apparatus according to Embodiment 2. The circulation process in the anomaly condition refers to a process for controlling the circulation operation in the anomaly condition. The circulation process shown in FIG. 8 is performed by aforementioned processor 61.

In step S21, processor 61 determines whether or not supply pump P1 operates. When supply pump P1 operates (YES in step S21), processor 61 proceeds to step S22.

In step S22, processor 61 determines whether or not the second predetermined time has elapsed. When the second predetermined time has elapsed (YES in step S22), processor 61 proceeds to step S23. In contrast, when the second predetermined time has not elapsed (NO in step S22), processor 61 proceeds to step S28.

In step S23, processor 61 opens circulation valve V2.

In step S24, processor 61 drives circulation pump P2.

In step S25, processor 61 determines whether or not the driving time for which circulation pump P2 is driven has reached 120 seconds. When the driving time of circulation pump P2 has reached 120 seconds (YES in step S25), processor 61 proceeds to step S26.

In step S26, processor 61 stops driving circulation pump P2.

In step S27, processor 61 closes circulation valve V2.

In step S28, processor 61 determines whether or not a power supply for image forming apparatus 1A is turned off. When the power supply for image forming apparatus 1A is turned off (YES in step S28), processor 61 ends the circulation process shown in FIG. 8. In contrast, when the power supply for image forming apparatus 1A is not turned off (NO in step S28), processor 61 returns to step S21.

The process procedure for controlling the circulation operation in the normal condition by image forming apparatus 1A according to Embodiment 2 is identical to the process procedure described above with reference to FIG. 6, and therefore, the detailed description thereof is not herein repeated.

Thus, in image forming apparatus 1A according to Embodiment 2, the circulation operation is performed not only in the normal case but also in the case where an anomaly occurs. In the case where an anomaly occurs, there is a high possibility that first supply channel R1 is clogged with ink and ink components in the ink channel are non-uniform. In image forming apparatus 1A according to Embodiment 2, the circulation operation is performed in the case where an anomaly occurs, to thereby eliminate the non-uniformity of ink components.

Embodiment 3

Image forming apparatus 1A according to Embodiment 2 is configured to perform the circulation operation, not only in the normal case, but also in the case where an anomaly occurs. In contrast, an image forming apparatus according to Embodiment 3 is configured to perform no circulation operation in the normal condition and perform the circulation operation only when an anomaly occurs.

In the image forming apparatus according to Embodiment 3, the circulation operation is performed in the case where an anomaly occurs, to thereby eliminate non-uniformity of ink components.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:

a main tank that stores ink;

a first storage tank that stores the ink supplied from the main tank;

an ink head that ejects the ink;

a first supply channel for supplying the ink from the main tank to the first storage tank;

a second supply channel for supplying the ink from the first storage tank to the ink head;

a heating section that is provided between the main tank and the first storage tank in the first supply channel and heats the ink; and a circulation channel for returning the ink in the second supply channel to a part, located between the main tank and the heating section, of the first supply channel, wherein the ink contains a plurality of wax components differing from each other in melting point, and at least a part of the first supply channel has a temperature of more than or equal to a first temperature that is a melting point of a first wax component lowest in melting point among the plurality of wax components, and less than a second temperature that is a melting point of a second wax component highest in melting point among the plurality of wax components.

2. The image forming apparatus according to claim 1, wherein a circulation valve is provided in the circulation channel, the image forming apparatus further comprises a processor, and the processor controls opening and closing of the circulation valve.

3. The image forming apparatus according to claim 2, wherein the processor opens the circulation valve when either:

a power supply for the image forming apparatus is turned on; or a circulation operation that returns the ink in the second supply channel to the part, located between the main tank and the heating section, of the first supply channel is not performed for a first predetermined time or more, is satisfied.

4. The image forming apparatus according to claim 2, further comprising:

a supply pump that supplies the ink from the main tank to the heating section; and a first sensor that detects an amount of the ink in the first storage tank, wherein the processor determines that an anomaly occurs, when the amount in the first storage tank does not reach a first threshold value within a second predetermined time elapsed from when the supply pump is driven, and when the processor determines that an anomaly occurs, the processor opens the circulation valve.

5. The image forming apparatus according to claim 3, further comprising:

a supply pump that supplies the ink from the main tank to the heating section; and a first sensor that detects an amount of the ink in the first storage tank, wherein the processor determines that an anomaly occurs when the amount in the first storage tank does not reach a first threshold value within a second predetermined time elapsed from when the supply pump is driven, when the processor determines that an anomaly occurs, the processor opens the circulation valve, the image forming apparatus further comprises a circulation pump that causes the ink in the second supply channel to be supplied to a part, located between the main tank and the heating section, of the first supply channel, the processor drives the circulation pump when the circulation valve is opened, and a driving time for which the circulation pump is driven when it is determined that an anomaly occurs is longer than a driving time for which the circulation pump is driven when either: a power supply for the image forming apparatus is turned on; or the circulation operation is not performed for the first predetermined time or more, is satisfied.

6. The image forming apparatus according to claim 5, further comprising a second storage tank that is provided in the second supply channel and stores the ink supplied from the first storage tank.

7. The image forming apparatus according to claim 6, wherein the circulation pump is provided in a part, located between the first storage tank and the second storage tank, of the second supply channel, and supplies the ink from the first storage tank to the second storage tank.

8. The image forming apparatus according to claim 7, wherein a supply valve is provided in the second supply channel, the image forming apparatus further comprises a second sensor that detects an amount of the ink in the second storage tank, when the amount in the second storage tank is less than a second threshold value, the processor opens the supply valve, and when the supply valve is opened, the processor drives the circulation pump.

9. The image forming apparatus according to claim 1, wherein the heating section melts the ink into a sol state.

* * * * *